(12) United States Patent
Garcia Morchon et al.

(10) Patent No.: US 9,344,453 B2
(45) Date of Patent: May 17, 2016

(54) SECURE PROTOCOL EXECUTION IN A NETWORK

(75) Inventors: Oscar Garcia Morchon, Aachen (DE); Daniel Martin Goergen, Eindhoven (NL); Tim Corneel Wilhelmus Schenk, Eindhoven (NL); Javier Espina Perez, Eindhoven (NL); Marc Aoun, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 235 days.

(21) Appl. No.: 14/123,307

(22) PCT Filed: Jun. 1, 2012

(86) PCT No.: PCT/IB2012/052763
§ 371 (c)(1),
(2), (4) Date: Dec. 2, 2013

(87) PCT Pub. No.: WO2012/168838
PCT Pub. Date: Dec. 13, 2012

(65) Prior Publication Data
US 2014/0115666 A1    Apr. 24, 2014

(30) Foreign Application Priority Data
Jun. 10, 2011    (EP) ..................... 11169391

(51) Int. Cl.
*H04L 29/06* (2006.01)
*H04L 9/32* (2006.01)

(52) U.S. Cl.
CPC .............. *H04L 63/20* (2013.01); *H04L 9/3242* (2013.01)

(58) Field of Classification Search
None
See application file for complete search history.

(56) References Cited

U.S. PATENT DOCUMENTS

| 2004/0034773 | A1 | 2/2004 | Balabine |
| 2010/0005297 | A1 | 1/2010 | Ganesan |
| 2013/0151852 | A1* | 6/2013 | Bian ...................... H04L 9/321 713/168 |

FOREIGN PATENT DOCUMENTS

| WO | 2009031110 A2 | 3/2009 |
| WO | 2009135324 A1 | 11/2009 |
| WO | 2011007301 A1 | 1/2011 |
| WO | WO 2011007301 A1 * | 1/2011 ............ H04L 9/3236 |
| WO | 2012090122 A1 | 7/2012 |
| WO | 2012168888 A1 | 12/2012 |

OTHER PUBLICATIONS

Deng et al., Secure Code Distribution in Dynamically Programmable Wireless Sensor Networks, IEEE, 2006.*
Dimitriou, Efficient Mechanism for Secure Inter-node and Aggregation Processing in Sensor Networks, Springer-Verlag, 2005.*
(Continued)

*Primary Examiner* — Minh Dinh (57) ABSTRACT

For secure configuration of network nodes from a backend with low connectivity requirements and workload at the backend and reduced communication overhead, a system, a control unit for a segment controller and a method for secure protocol execution in a network are provided, wherein protocol information is provided to a segment controller (60) for controlling a node (10) and a protocol is performed based on the protocol information to control the node (10), at least one response message of the node (10) being required at the segment controller (60) for performing one or more steps of the protocol.

14 Claims, 8 Drawing Sheets

(56) References Cited

OTHER PUBLICATIONS

Di Pietro et al., LKHW—A Directed Diffusion-Based Secure Multicast Scheme for Wireless Sensor Networks, IEEE, 2003.*

Eschenauer et al., A Key-Management Scheme for Distributed Sensor Networks, ACM, 2002.*

Lanigan et al., Sluice: Secure Dissemination of Code Updates in Sensor Networks, 2006.*

Liu et al., Lightweight Remote Image Management for Secure Code Dissemination in Wireless Sensor Networks, IEEE, 2009.*

Zhu et al., LEAP: Efficient Security Mechanisms for Large-Scale Distributed Sensor Networks, ACM, 2003.*

"Information Technology—Open Systems Interconnection—Systems Management Overview", X.701, ITU-T Standard, Aug. 1997, pp. 1-35.

"Management Framework for Open Systems Interconnection (OSI) for CCITT Applications", X.700, ITU-T Standard in Force, Sep. 1992, pp. 1-15.

"Security Architecture for Open Systems Interconnection for CCITT Applications", x.800, ITU-T Standard, Mar. 1991, pp. 1-48.

* cited by examiner

SECURE PROTOCOL EXECUTION IN A NETWORK

CROSS-REFERENCE TO PRIOR APPLICATIONS

This application is the U.S. National Phase application under 35 U.S.C. §371 of International Application No. PCT/IB2012/052763 filed on Jun. 1, 2012, which claims the benefit of European Patent Application No 11169391.7, filed on Jun. 10, 2011. These applications are hereby incorporated by reference herein.

FIELD OF THE INVENTION

The invention relates to a system, a control unit for a segment controller and a method for secure protocol execution in a network.

BACKGROUND OF THE INVENTION

Recently, wireless mesh networks attract more and more attention, e.g. for remote control of illumination systems, building automation, monitoring applications, sensor systems and medical applications. In particular, a remote management of outdoor luminaires, so-called telemanagement, becomes increasingly important. On the one hand, this is driven by environmental concerns, since telemanagement systems enable the use of different dimming patterns, for instance as a function of time, weather conditions or season, allowing a more energy-efficient use of the outdoor lighting system. On the other hand, this is also driven by economical reasons, since the increased energy efficiency also reduces operational costs. Moreover, the system can remotely monitor power usage and detect lamp failures, which allows for determining the best time for repairing luminaires or replacing lamps.

Figure 1:
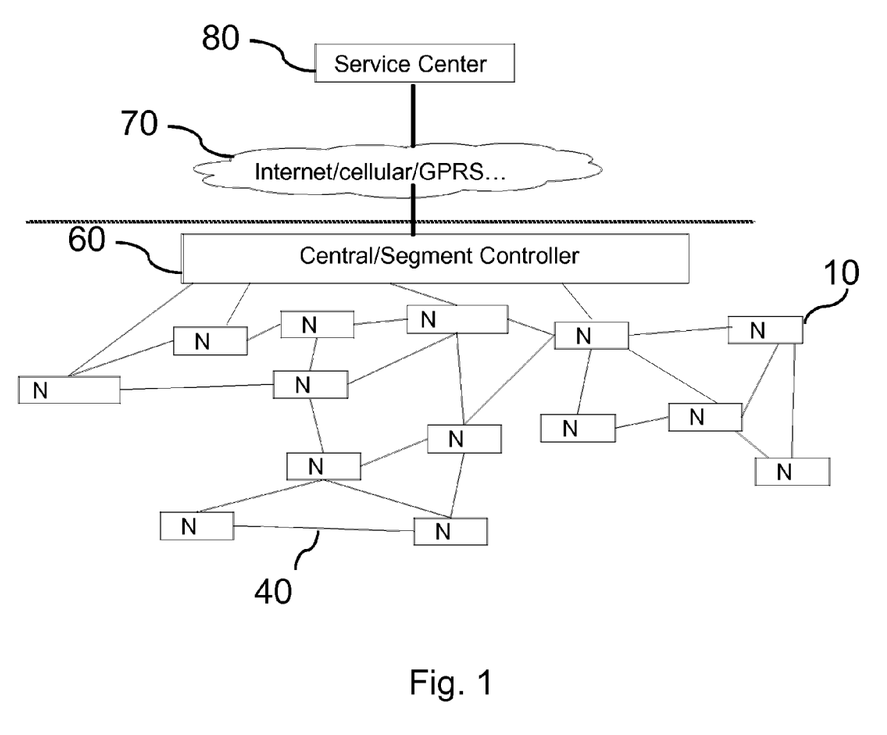
FIG. 1 illustrates an example of a wireless mesh network.

Current radio-frequency (RF) based wireless solutions preferably use a mesh network topology, e.g. as shown in FIG. 1. The wireless network comprises a central controller or segment controller 60 and a plurality of nodes 10 (N) being connected among each other by wireless communication paths 40 in a mesh topology. Thus, the nodes 10 and the central controller 60 may comprise a transceiver for transmitting or receiving data packets via wireless communication paths 40, e.g. via RF transmission. In the backend, a service center 80 is situated and serves for system management. This entity normally communicates with one or more central controllers 60 of a corresponding network as a commissioning tool in charge of controlling or configuring this network over a third party communication channel 70, such as the Internet or mobile communication networks or other wired or wireless data transmission systems. In case of a lighting system or any other large wireless network, a network can also be divided into segments, so that a node 10 belongs to exactly one segment having one segment controller 60. Therefore, the terms "segment controller" and "central controller" should be seen as exchangeable throughout this description.

In general, any node 10 of the mesh network can communicate with the service center 80 via the segment controller 60. However, in some situations, high security standards have to be fulfilled in order to provide basic security services. An example is protection against a man-in-the-middle attack, i.e. preventing sensitive information being provided to non-authorized nodes 10 or preventing manipulation of the information provided to the nodes 10. For instance, outdoor lighting control involves the remote management of lighting nodes requiring a communication link between the service center 80 and the nodes 10 themselves through a controlling device such as a segment controller 60. In contrast to the service center 80 and the nodes 10, the segment controller 60, which is in the middle, is often not fully trusted since it may be managed and manipulated by third parties such as installers or customers. Thus, a segment controller 60 may act as a man-in-the-middle and manipulate some messages. This makes the execution of security protocols challenging. For instance, keying material cannot be provided to the segment controller 60, since it may be misused. Therefore, it is required to find means that allow to upgrade and/or activate software functionalities of the network nodes 10 or the like without being afraid of an intruder being able to put malware on the nodes 10. For this, it is important to ensure that a protocol for performing such actions is correctly performed by the segment controller 60.

Traditional end-to-end security protocols that allow for an end-to-end authentication between two trusted entities require the interactive exchange of messages between the service center 80 and the nodes 10, e.g., based on a challenge-response authentication handshake. Although such a procedure provides high security, it poses severe requirements regarding the usage of the GPRS link 70 as shown in FIG. 1 and regarding the service center 80 in the backend, since it involves continuous connections, more bandwidth and more operations at the service center 80. Thus, an end-to-end security handshake from the service center 80 to the nodes 10 ensuring, e.g., mutual authentication, is expensive and involves a lot of data traffic, continuous connection with the backend, more bandwidth and more operations at the backend.

Hence, it is desired to find means for communicating with network nodes 10 from the backend via an intermediate controlling device, providing a reasonable trade-off between security and operational needs suitable for the respective application.

SUMMARY OF THE INVENTION

In view of above disadvantages and problems in the prior art, it is an object of the present invention to provide a system, a control unit for a segment controller and a method for secure protocol execution in a wireless network, allowing for the secure configuration of network nodes from a backend, while minimizing connectivity requirements and workload at the backend and reducing the communication overhead.

The invention is based on the idea to force a controlling device, which serves as an intermediate entity between network nodes and a service center, to carry out a particular protocol with at least one of the nodes by providing the controlling device with corresponding protocol information, wherein the controlling device requires a predetermined response message from the respective node(s) in order to carry out a next step of the protocol. It is to be understood that the service center as well as the controlling device or segment controller may also be represented by a certain network node, respectively. The predetermined response message may relate to a correct response(s) from the respective node(s), which can only be given by the node in case that the protocol is performed correctly. Thus, the protocol may be performed by the intermediate controlling device without causing extensive data traffic as it would be involved, e.g., in a common security handshake, thereby reducing the communication overhead. Moreover, by making the protocol execution dependent on a valid answer of the node to be controlled, manipulation of information provided to the node or misuse of the information by the controlling device may be prevented. Therefore, features of an end-to-end handshake between the nodes and the backend can be realized with respect to security. In one example, the protocol may relate to at least one of configuring the network nodes, updating node software, activating node features and commissioning of the nodes. Then, e.g., software update information may be provided to the nodes via the controlling device, while preventing manipulation of this information and preventing the information being provided to other nodes than the target nodes. Since the controlling device may only be able to proceed with the protocol having valid response messages from the right target node(s), correct protocol-based operation of the controlling device can be enforced.

According to one aspect of the present invention, a system for ensuring correct protocol execution in a network, such as a wireless mesh network, having one or more nodes is provided. The system comprises a service center and a segment controller, wherein the service center provides protocol information to the segment controller for carrying out a protocol with at least one particular node of the network nodes. In order to be able to use the protocol information, the segment controller may need information provided by this node in a response message. The response message may be sent by the node, after having received a message from the segment controller, e.g. announcing a particular information or execution of a particular protocol. Preferably, the node provides a valid response message to the segment controller only after successful verification of a previous message or information received from the segment controller. Therefore, the segment controller may be forced to provide the right protocol information to the right node in order to receive a valid response message for performing a further, following or subsequent step of the protocol. By these means, correct operation of the segment controller may be supervised by the node to be controlled, i.e. the target node, thus preventing misuse of the protocol information. Likewise, this prevents malware to be successfully installed on the node. Hence, it may be guaranteed without control by the service center that only information authorized by the service center is distributed to network nodes and that only parties authorized by the service center have access to the distributed information. Since no continuous communication with the service center may be required in this process, the service center may be partially offline.

In one embodiment, the response message of the node includes information about an identity of the node and/or about an identifier of the message received from the segment controller, to which the node is responding with the response message. The identifier of the message may be a string or value derived from the received message, e.g. a fingerprint of the message from the segment controller. Here, a fingerprint refers to uniquely identifying data by extracting from it a small key. Thus, the identifier of the message may relate to a function of a content of the message sent from the segment controller. The node identity may relate to an individual key of the node. In this case, it may also be ensured that the segment controller performs the protocol with the correct target node. However, the node identity may also relate to a symmetric key common to all nodes of the network, e.g. a commissioning key. This key or the node identity is preferably not known to the segment controller. Thus, the node may generate a check value or string depending on the content of the received message and/or based on its identity. By these means, the response message indicates the identity of the receiving node as well as the content of the received message, so that a correct protocol execution can be easily verified.

Preferably, the response message from the node (or parts thereof) is required in order to decrypt at least a part of the protocol information provided by the service center to the segment controller. Thus, the segment controller may generate a key for decryption based on the response message from the node. For instance, the segment controller may be provided by the service center with an at least partially encrypted configuration message for configuring at least one of the network nodes. In order to proceed with the configuration of the node, the segment controller may require the response message for decryption. The response message may include a security key of the node, e.g. node identity or commissioning key, a message fingerprint or the like in an inseparable or coded way, so that the segment controller or eavesdropping entities cannot derive the original security keys. Therefore, the segment controller can be enforced to carry out a specific protocol with specific nodes by providing the segment controller with correspondingly encrypted protocol information. Thus, the segment controller can neither misuse the nodes nor transmit the protocol information to non-authorized nodes, since the segment controller can only decrypt and use the protocol information, when following the protocol. If it does not follow the protocol correctly, it cannot decrypt the information and thus cannot misuse the information. After the segment controller has decrypted at least a part of the protocol information using the response message, the segment controller may forward some or all of the decrypted protocol information to the node or nodes in the network.

Preferably, the protocol information is encoded based on different keys. In this embodiment, the node(s) in a network may return (a) response messages corresponding to the last received message from the segment controller. These/this response messages (or party of them/it) may be used in turn by the segment controller to generate the next key for decrypting the next part of protocol information. For instance, information for a subsequent protocol step may be encoded with an expected valid response message of the node to a message from the segment controller relating to a previous protocol step. Thus, the protocol information may be iteratively decrypted. By these means, the correct operation of the segment controller is observed and ensured step by step.

In a preferred embodiment, the segment controller is provided with the protocol information for all steps of the protocol. In this case, the protocol information may be encoded based on different keys. This allows executing the protocol by involving mainly interactions between the segment controller and the nodes, since the security is already guaranteed by the requirement of the correct response message. Hence, the connectivity with the backend required for performing the protocol as well as the number of operations at the backend can be decreased.

Additionally, the segment controller may send a request for protocol information related to a subsequent protocol step to the service center, wherein the request message is based on the response message received from the at least one node. Thus, the service center may verify using the information about the response message of the node included in the request message that the segment controller has performed the previous protocol step with the correct node and/or in a correct way. Then, the service center may provide the segment controller with further protocol information required for performing a next protocol step. In case that more than one node is controlled with the protocol, the segment controller may aggregate information about all response messages (or a subset of them) from the respective nodes in the request message to the service center. Here, the service center may in addition check, whether all of the nodes to be controlled have been successfully addressed in the previous protocol step.

Preferably, the service center and a node of the network share at least one of a common security key, a commissioning key, a cryptographic function such as hash function, an iteration number of a hash function and a current hash value. The service center may know a security key individual for each network node or a security key common to all network nodes or for one or more groups of network nodes. Alternatively or additionally, the service center may keep a hash chain or hash function for each network or network segment and a start value $a_0$ thereof. Then, a node may be initialized with the anchor of the respective hash chain or function. The hash function may be replaced by another one-way function or chain, wherein an iterative application of the function gives chain links or elements derived from a starting string or starting value, e.g. $a_i$=HASH($a_{i-1}$). Preferably, the protocol and/or the response message is at least partially based on a hash function such as a hash algorithm SHA-2. By these means, a node, which is initialized with the anchor of the hash chain and which keeps track of the current hash chain element can verify a received message by checking, whether the hash element $a_{i-1}$ included in the received message satisfies the condition: $a_i$=HASH($a_{i-1}$). Hence, using hash chains or other one-way function allows authentication without public-key cryptography.

In some embodiments, the protocol may include providing information to one ore more nodes of the network. Then, the information is preferably protected based on a secret key derived from a master secret and an information identity number. The information may be transmitted from the service center via the segment controller to the node. Thus, in order to secure the information, the secret key may be based on a master secret, i.e. a string or value only known to the node and the service center, but not to the segment controller. For instance, a master secret may relate to a security key of the node or a commissioning key of the node. Moreover, the secret key may additionally include an information identity number, e.g. a random number, a nonce or a salt set by the service center. Thus, in the example that the information relates to a software update, the information identity number may correspond to a software update number or software number. By these means, sensitive information can be protected and features of an end-to-end security handshake between the service center and the node can be mimicked.

In one embodiment, the service center may provide a random number, a salt or a nonce specific for the protocol to the node. This may be required at the node as an input in a one-way function such as a hash function. Preferably, the salt or nonce is at least 16 bytes long. The random number, salt or nonce may relate to the information identity number described above.

At least one of these protocol steps may include providing configuration information to a node or reconfiguration a node or rebooting a node or any combination thereof. Preferably, a reboot step may be additionally protected by means of an authentication token, e.g., a new hash chain link. Thus, a current or valid hash chain link has to be provided to the node in order to admit permit rebooting. The service center may therefore provide the segment controller with the current hash chain link, which may be the same for several nodes, so that rebooting in a synchronized manner is possible. This may enable a more secure and stable network operation, in particular, when providing a software update to a plurality of nodes.

When completing the protocol, the segment controller may send a confirmation message to the service center. The confirmation message may be based on at least one response message received at the segment controller from the respective nodes. Thus, the confirmation message may include information about the identity of the respective node(s) and/or about the content of the last message from the segment controller received at the respective node(s). In the example of a software update, the last message, which the node receives from the segment controller, may include a software image, possibly encoded by a secret key. Therefore, the corresponding response message from the node to the segment controller may comprise information about the node identity and/or a fingerprint of the software image, so that the service center may verify that the right node is updated and/or that the node is updated with the right software. Therefore, the service center may be only involved in the protocol, when providing the protocol information to the segment controller and when receiving the confirmation message from the segment controller. Thus, communication with the service center is reduced, while still enabling secure controlling of the network nodes via an intermediate entity, i.e. the segment controller.

In a preferred embodiment of the present invention, the system is applied for telemanagement of a lighting system. For instance, the node of the wireless network may correspond to a luminaire of the lighting system, such as a street lighting system or any other lighting system. In such systems, communication between the segment controller and the service center may rely on third party structures, while communication between the segment controller and the nodes are based on the wireless transmission within the network. Therefore, reducing communication with the service center results in lower maintenance costs.

According to another aspect of the present invention, a control unit for a segment controller is provided allowing for secure protocol execution in a wireless network one or more nodes. By means of the control unit according to the present invention, the segment controller is adapted to perform a protocol based on protocol information provided by a service center in order to control at least one of the network nodes, wherein the execution of the protocol depends on at least one response message of the controlled node. Thus, the control unit for the segment controller according to the present invention can be applied to a segment controller of any above-described embodiment for a system according to the present invention. The control unit may be incorporated, integrated, mounted to or operatively coupled to the segment controller.

According to a further aspect of the present invention, a method for secure protocol execution in a wireless network having one or more nodes is provided. According to the method, protocol information is provided to a segment controller of the network for control of at least one of the network nodes. The segment controller performs the protocol based on the received protocol information. For this, the segment controller needs at least one response message of the at least one node in order to carry out the protocol. Hence, the method according to the present invention is adapted to be performed by the system or the control unit of a segment controller according to any of the above-described embodiments of the present invention.

These and other aspects of the invention will be apparent from and elucidated with reference to the embodiments described hereinafter. The invention will be described in more detail with respect to exemplary embodiments that are illustrated by the accompanying figures. However, the invention is not limited to these exemplary embodiments.

DETAILED DESCRIPTION

Preferred applications of the present invention are actuator networks, sensor networks or lighting systems, such as outdoor lighting systems (e.g. for streets, parking and public areas) and indoor lighting systems for general area lighting (e.g. for malls, arenas, parking, stations, tunnels etc.). In the following, the present invention will be explained further using the example of an outdoor lighting system for street illumination, however, without being limited to this application. In the field of lighting control, the telemanagement of outdoor luminaires via radio-frequency network technologies is receiving increasing interest, in particular solutions with applicability for large-scale installations with segments of above 200 luminaire nodes. Since radio frequency (RF) transmissions do not require high transmission power and are easy to implement and deploy, costs for setting up and operating a network can be reduced. However, the data packet transmission may alternatively use infrared communication, free-space-visible-light communication or power line communication.

In a telemanagement system for lighting control, the number of luminaire nodes 10 is extremely high. Hence, the size of the network is very large, especially when compared to common wireless mesh networks, which typically contain less than 200 nodes. In addition, the nodes 10 typically have limited processing capabilities due to cost considerations, so that processing and memory resources in the luminaire nodes 10 will be limited. Thus, security measures and communication protocols for transmitting data packets between single nodes 10 should consider the limited resources for efficient and secure data packet transmission. Finally, compared to other so-called ad-hoc mesh networks, the telemanagement system for an outdoor lighting control network is stationary, i.e. the luminaire nodes 10 do not move. Since the luminaire nodes 10 (e.g. the lamp poles) are stationary, node positions will not change over time. Thus, the physical positions of the nodes 10, for instance GPS-coordinates or other position data, may be known in the system, enabling geographic or position-based routing using pre-programmed or predefined positions.

In the following, embodiments of the present invention will be described using the example of a protocol for software updates. However, the present invention is not limited thereto and the protocol to be performed by the segment controller 60 may also relate to activation of node features and the like.

Figure 2:
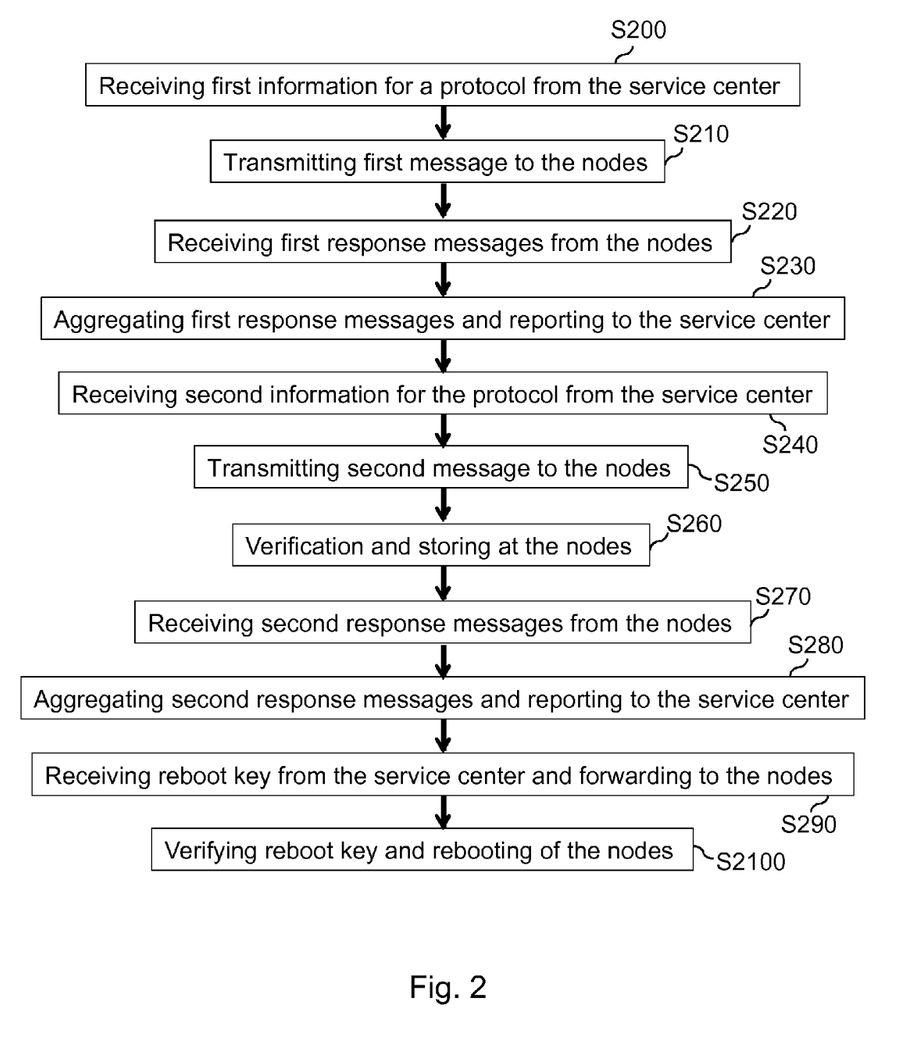
FIG. 2 shows a flow diagram illustrating an embodiment of the present invention.
Figure 3:
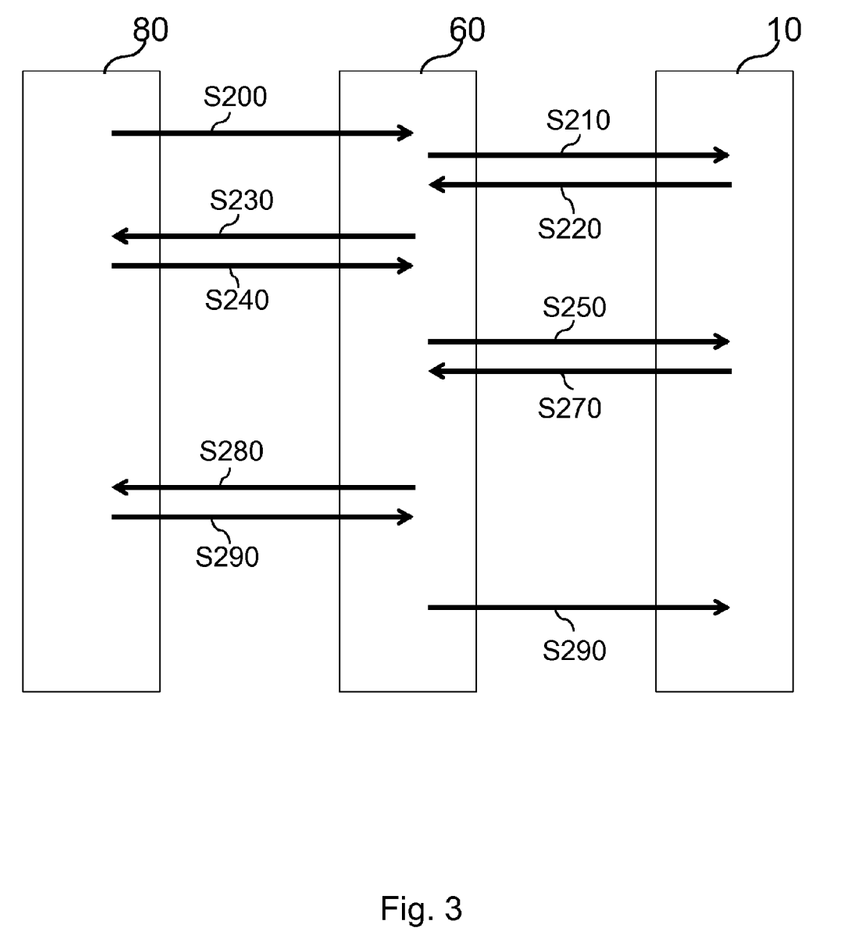
FIG. 3 shows a schematic view of the process of FIG. 2.

In FIG. 2, a first embodiment for ensuring secure protocol execution by the segment controller 60 is shown. In FIG. 3, the data traffic of the example shown in FIG. 2 between the service center 80, the segment controller 60 and the network node 10 is schematically illustrated. The arrows in FIG. 3 indicate the direction of communication, while time can be considered to run in the downward direction.

In a first step S200, the service center 80 provides information for executing a protocol to the segment controller 60. Receiving this information, the segment controller 60 starts to perform the corresponding protocol. Thus, the segment controller 60 transmits a first message to one or more nodes 10 (S210), e.g. for announcing the start of the protocol. Each node 10 acknowledges the message received from the segment controller 60 with a response message including an index or identifier of the content of the received message and an identifier or key indicating the node identity (S220). In step S230, the segment controller 60 collects the response messages from the nodes 10 and forwards them in a compressed form, e.g. aggregated in a batch message, to the service center 80. By these means, the service center 80 can verify that the segment controller 60 has performed the first steps of the protocol correctly and successfully. This may include verifying that the first message included the correct content, that the first message was successfully received by the nodes 10 or that the segment controller 60 has transmitted the first message to the correct nodes 10, i.e. to the target nodes of the protocol. After having determined that at least one verification was successful, the service center 80 transmits information for further steps of the protocol to the segment controller 60 (S240). Thus, in step S250, the segment controller 60 can perform the next step of the protocol, e.g. transmitting a second message to the nodes 10. Preferably the second message comprises the software image of the software update, which is stored by the nodes 10 in step 260. In addition, some identifying means may be included in the first message and the second message, so that the nodes 10 can verify the content of the received second message before storing it (S260). Then, in step S270, the nodes 10 transmit to the segment controller 60 second response messages, which dependent on the received content and the respective node identity like the first response messages. In step S280, the segment controller 60 aggregates the second response messages into a batch of messages and forwards it to the service center 80. After successful verification by the service center 80, the service center 80 provides a reboot key to the segment controller 60 for activating the new software (S290). When receiving and successfully verifying the reboot key, the nodes 10 are rebooted in step 2100. Optionally, the segment controller 60 may receive confirmation messages from the nodes 10 after rebooting and forward them in a further message batch to the service center 80. For increasing security, also certain time intervals may be set for receiving expected messages. For instance, a maximum time interval may be set at the service center 80 for the initiation of the protocol in step S200 and the provision of the reboot key in step S290. It is also to be understood that more than two steps of the protocol are controlled in this way, i.e. that there are further iterations like the steps S200 to S230 or S240 to 280.

Therefore, according to the embodiment shown in FIGS. 2 and 3, the nodes 10 report to the service center 80 via the segment controller 60, which of the nodes 10 has received the message from the segment controller 60 and what they have received. Only after the service center 80 has verified correct protocol execution, it provides the segment controller 60 with information for further steps of the protocol. Since the segment controller 60 bundles the response messages of the single nodes 10 and forwards them in a batch message, the data traffic between the segment controller 60 and the service center 80 can be reduced. Thus, due to the dependence of the response messages of the nodes 10 on the node identity and on the content of the message received from the segment controller 60, the segment controller 60 will only receive valid response messages, when performing the protocol correctly. Therefore, although the protocol is performed by a not fully trusted entity, i.e. the segment controller 60, correct protocol execution can be stepwise enforced without requiring high data load on the connection to the service center 80.

Figure 4:
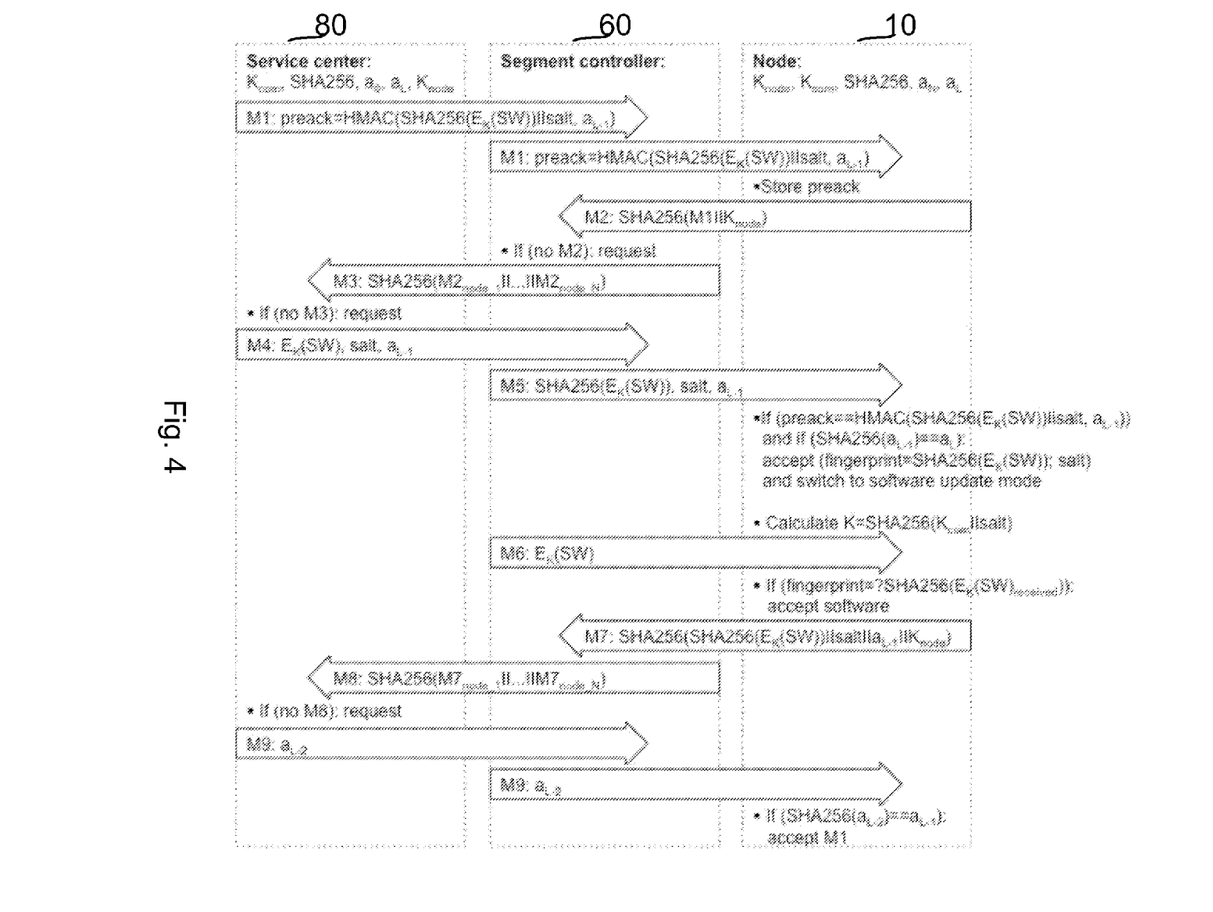
FIG. 4 shows a diagram for a process according an embodiment of the present invention.

In FIG. 4, a more detailed example for the first embodiment of the present invention is shown. In this example, the service center 80 knows a commissioning key $K_{com}$ common to all nodes of the network, node identities or node specific keys $K_{node}$ of the network nodes 10, a HASH-function such as SHA256 is used by the nodes in the network, a start value of the HASH-function $a_0$, and at least one of an iteration number 1 of the HASH-function and a last used HASH-chain element $a_L$. The network nodes 10, in contrast, know the commissioning key $K_{com}$, the HASH-function SHA256 of the network, a last element or anchor $a_N$ of the HASH-chain and the last HASH-chain element $a_L$ that has been disclosed.

Figure 5:
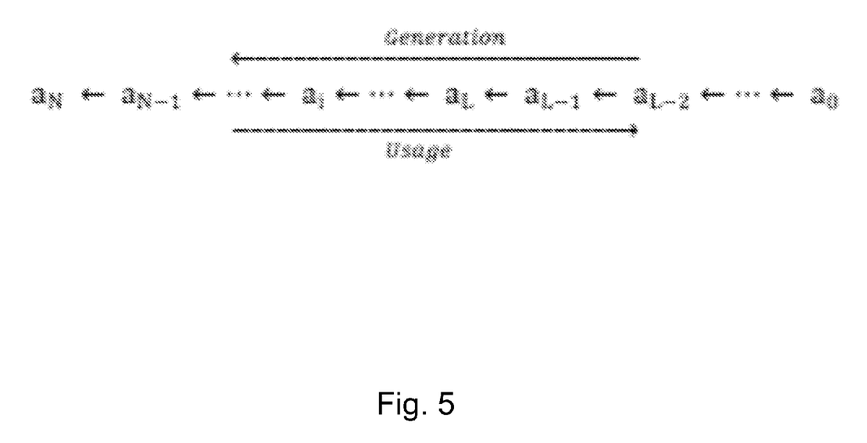
FIG. 5 illustrate the principle of a HASH chain.

In FIG. 5, the principle of a HASH-chain is illustrated. The HASH-chain includes N elements $a_i$ that are generated using a one-way HASH-function with $a_i$=HASH($a_{i-1}$). Thus, each element $a_i$ of the HASH-chain can only be generated based on the preceding HASH-chain element $a_{i-1}$. Since only the service center 80 knows the initial HASH-chain element $a_0$, only the service center 80 can generate the next HASH-chain element $a_{i+1}$. For authentication of an information, the service center 80 uses the HASH-chain elements $a_i$ in the opposite direction, as shown in FIG. 5. For instance, the service center 80 includes the current HASH-chain element $a_{L-1}$ in a message to the node 10. Then, the node 10, which only knows the last used HASH-chain element $a_L$, can verify the message by checking whether $a_L$=HASH($a_{L-1}$). By these means, information can be authenticated without need for public-key cryptography.

As shown in FIG. 4, the service center 80 initiates the execution of a software updating protocol performed by the segment controller 60 by transmitting a first message M1 to the segment controller 60. The first message M1 includes a preack, the preack being the value of a function such as a message authentication-code function depending on a current HASH-chain element $a_{L-1}$ and a fingerprint of the software update. Here, the fingerprint can also refer to a value of a function or a string. For instance, the preack may be obtained using the following expression:

$$M1:preack=HMAC(SHA256(E_k(SW))\|salt,a_{L-1}),$$

wherein the two upright lines indicate concatenation, HMAC relates to a keyed HASH-message authentication-code, SHA256 is a HASH-function SHA-2 with a 256-bit fingerprint, $E_K$ relates to an encryption function based on an encryption key K, SW denotes the software update, salt is an at least 16 byte nonce specific for the software update and $a_{L-1}$ is the current HASH-chain element. The encryption key K may be derived from the commissioning key $K_{com}$ and the salt, e.g. as K=HMAC(salt, $K_{com}$). The segment controller 60 forwards the message M1 to the node 10, which stores the preack. The preack is used for enabling verification of the software update and the origin of the message content in a subsequent step. Since the preack has only very small information amount, memory at the nodes can be saved. Then, the node 10 creates a response message M2 based on the message content of the received message M1 and the node specific key $K_{node}$. For instance, the response message M2 of the node 10 may include the result of following expression:

$$M2:SHA256(M1\|K_{node})$$

In general, a message authentication code is derived from M1 and $K_{node}$. If the segment controller 60 does not receive a response message M2 from an addressed node 10, the segment controller 60 may request this node 10 to sent the response message M2. Possibly, a certain time interval is set at the segment controller 60 for defining a maximum time interval for receiving the response messages. After the segment controller 60 has received the response messages $M2_{node\_1}, \ldots, M2_{node\_N}$ from the respective nodes 10, it transmits a message M3 to the service center 80 based on the received response messages $M2_{node\_1}, \ldots, M2_{node\_N}$. For instance, the segment controller 60 aggregates the response messages $M2_{node\_1}, \ldots, M2_{node\_N}$, e.g. using the HASH-function:

$$M3:SHA256(M2_{node\_1}\|\ldots\|M2_{node\_N})$$

If the service center 80 has not received the message M3 within a predetermined time, the service center 80 may request the message M3 from the segment controller 60. When receiving the message M3, the service center 80 can verify using the message M3 that the correct target nodes 10 have been addressed and that all target nodes 10 have successfully received the first message M1. Then, the service center 80 transmits a message M4 to the segment controller 60 including the encrypted software update $E_K$(SW), the salt and the current HASH-chain-element $a_{L-1}$. The segment controller 60 calculates a fingerprint of the encrypted software update, e.g. SHA256($E_K$(SW)), and transmits a message M5 to the node 10 including the fingerprint of the encrypted software update, the salt and the current HASH-chain element $a_{L-1}$. Then, the node 10 determines whether the value of the preack received in the message M1 is identical to the result of a predefined function, when inputting parameters received with the message M5. Hence, in the example shown in FIG. 4, the node 10 checks whether:

$$preack=HMAC(SHA256(E_K(SW))\|salt,a_{L-1}))$$

In addition, the node 10 determines whether the last used HASH-chain element $a_L$ can be derived by applying the HASH-function to the HASH-chain element $a_{L-1}$ included in the message M5, e.g. whether SHA256($a_{L-1}$)=$a_L$. If both of these verification processes are successful, the node 10 accepts the fingerprint of the encrypted software update and the salt, which were received with the message M5, and switches to a software update mode. Moreover, the node 10 can now calculate the encryption key K based on the salt and the commissioning key $K_{com}$. Meanwhile or afterwards, the segment controller 60 transmits a further message M6 to the node 10 including the encrypted software update. If the node 10 can verify that the previously accepted fingerprint is identical to the calculated fingerprint of the encrypted software update received with the message M6, it will accept the software update and store the same. Instead of transmitting the messages M5 and M6, however, the segment controller 60 may also just forward the message M4 to the node 10. Anyway, the node 10 will return a second response message M7 to the segment controller 60 including a fingerprint of the received encrypted software update, the salt, the current HASH-chain element $a_{L-1}$ and the node specific key $K_{node}$. For instance, the message M7 may include:

$$M7:SHA256(SHA256(E_K(SW))\|salt\|a_{L-1}\|K_{node})$$

The segment controller 60 collects the response messages $M7_{node\_1}, \ldots, M7_{node\_N}$ from all nodes 10 and aggregates them into a batch message M8, which is transmitted to the service center 80. After having received and verified that the message M8 is correct, i.e. that the segment controller 60 has executed the protocol steps correctly, the service center 80 provides the segment controller 60 with message M9 including the next HASH-chain element $a_{L-2}$. This is used by the segment controller 60 as a reboot key for rebooting the target nodes 10 and activating the new software. Thus, in the last step, the segment controller 60 forwards the message M9 including the reboot key or HASH-chain element $a_{L-2}$ to the network nodes 10. When verifying that the HASH-chain element key $a_{L-2}$ is valid, the network nodes 10 can be rebooted in a synchronized manner and the new software on the network nodes 10 is activated. Possibly, a confirmation of the successful update and rebooting is sent from the nodes via the segment controller 60 to the service center. It should be noted that instead of the HASH-function SHA256, any other cryptographic function can be used to generated a message authentication code.

Thus, a fingerprint of a software update can be distributed to predetermined target nodes 10 or to all nodes 10 of the network and the nodes 10 can be rebooted in a synchronized manner. This approach uses two links of the HASH-chain to sign the software fingerprint and the rebooting message, respectively. Moreover, the software update itself is protected with a secret encryption key K specific for the software update, so that the segment controller 60 has no access to the software update. Therefore, according to the first embodiment of the present invention, a secure and economic protocol for software updates can be provided without the need of public key cryptography.

However, this embodiment has a few limitations. For instance, it requires that the service center 80 is online, since a software update can only be finished after providing the reboot key in the message M8. Moreover, the protocol can be manipulated in order to store another software on the network nodes 10, yet without being able to activate this software. This fake software upload attack may occur as follows: After reception of message M4, the manipulated segment controller 60 can send a number of fake messages M1, so that the nodes 10 have to drop the actual message M1 provided by the service center 80. Then, the segment controller 60 can generate a fake message M5 based on a fake software update. If the segment controller has even access to the commissioning key $K_{com}$, the segment controller 60 may be able to generate a valid software encryption key K using the salt received with the message M5 from the service center 80 and put another software on a node 10. Generally, however, the segment controller 60 will have no access to the commissioning key $K_{com}$ and can hence create no valid encryption key K. In this case, the segment controller 60 can only fill the memory of the node 10 with useless information. Yet, in any of these cases, the segment controller 60 cannot activate the fake software, because it lacks the HASH-chain element $a_{L-2}$ as reboot key.

Figure 6:
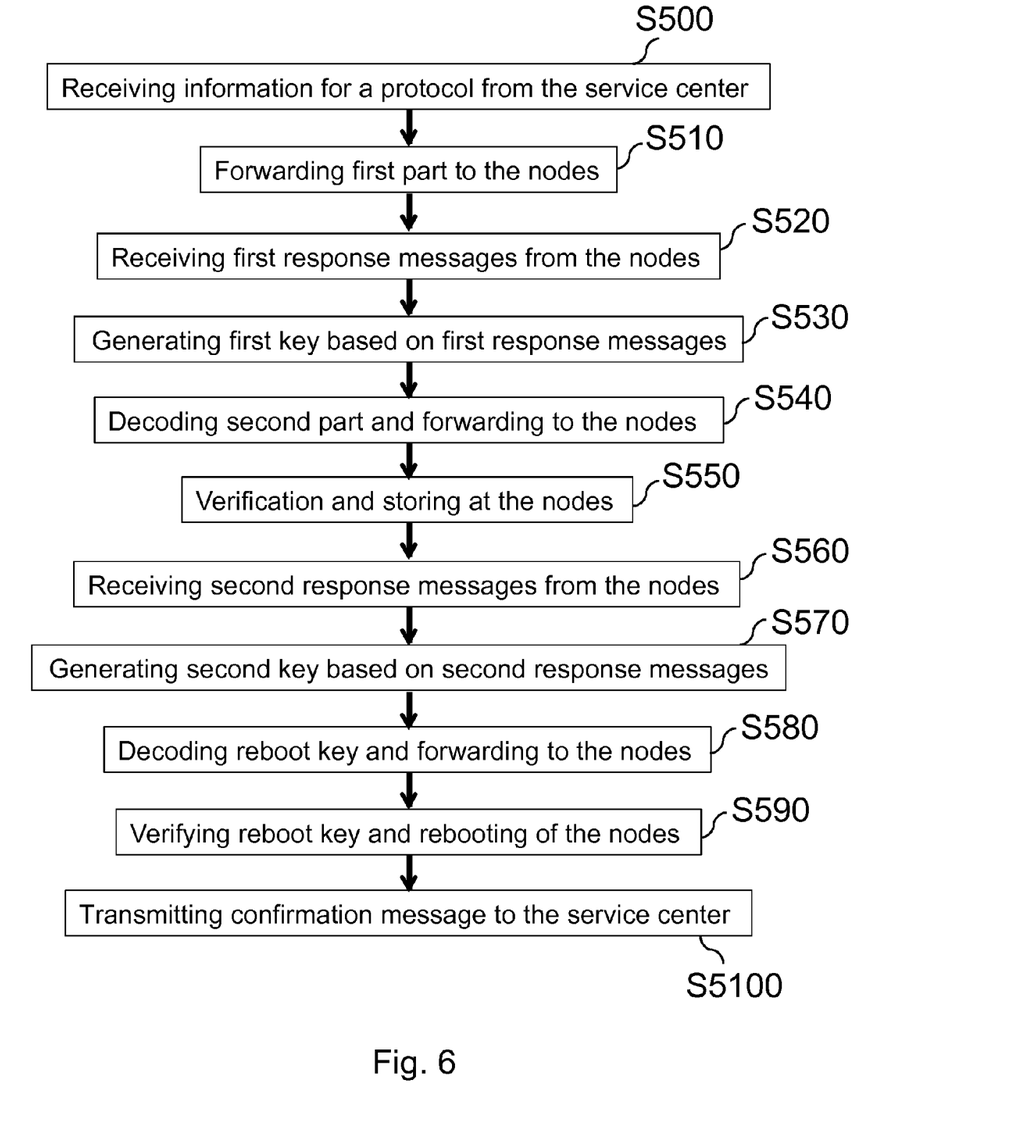
FIG. 6 shows a flow diagram illustrating another embodiment of the present invention.
Figure 7:
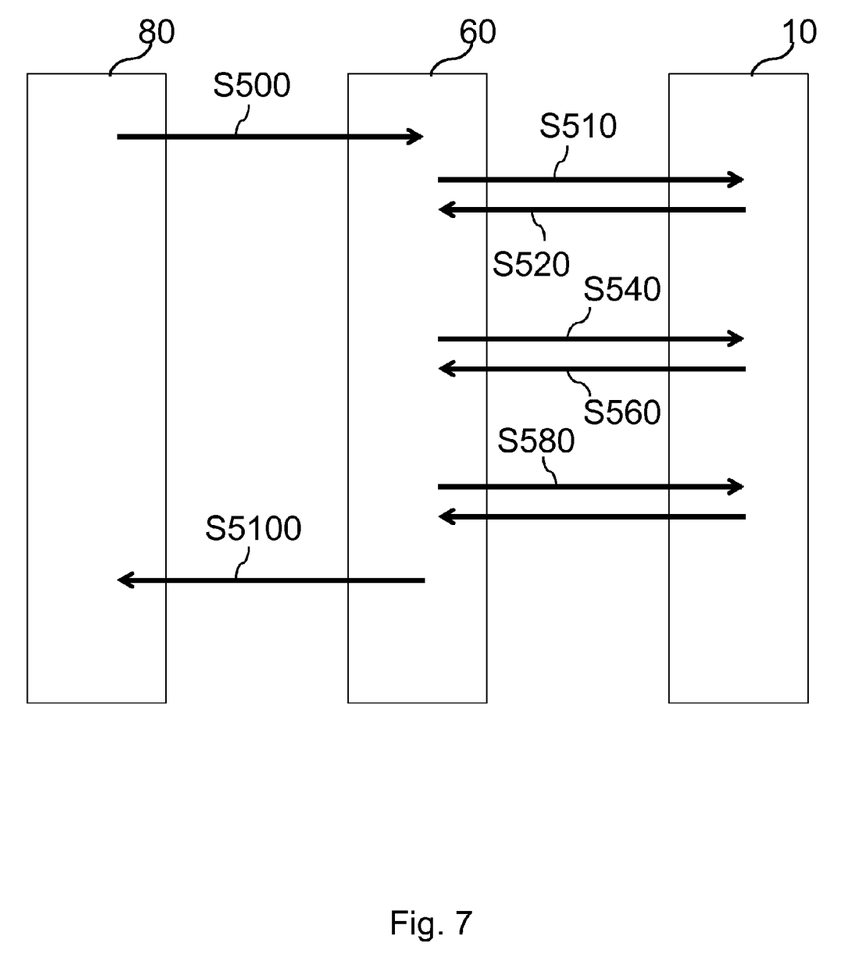
FIG. 7 shows a schematic view of the process of FIG. 6.

In FIG. 6, a second embodiment of the present invention is illustrated, which can overcome at least some of these drawbacks of the first embodiment. FIG. 7 is a schematic view of the embodiment described with respect to FIG. 6 indicating the direction of communication between the different entities. The main difference of this embodiment to the first embodiment is that the segment controller 60 is provided with all information for protocol execution with a first message from the service center 80, wherein the information for different protocol steps is encrypted based on different keys. By these means, the data traffic between the service center 80 and the segment controller 60 can be minimized, so that the service center 80 only has to trigger the software update protocol and optionally receive an acknowledgement, once the protocol is finished. Thus, this allows for offline operation of the service center 80, since the service center 80 only has to provide the first message M0 and can then be offline for the rest of the time.

In a first step S500 of FIG. 6, the service center 80 provides the segment controller 60 with all information required to execute a software update protocol. Yet, only a first part of this information is not encoded and can thus be used by the segment controller 60. The segment controller 60 forwards this part of information to the respective target nodes 10 (S510). Each node 10 returns a response message based on the received message content and its node identity (S520). Using the response messages from the nodes 10, the segment controller 60 is now able to generate a first encryption key (S530) in order to decode a further part of protocol information. Since the response messages depend on the node identity and on the message content transmitted to the node and since the segment controller 60 is only able to decode the next part of protocol information with valid response messages, the segment controller 60 is forced to provide the correct content to the correct nodes 10 in order to be able to proceed with the protocol. Using the generated encryption key, the segment controller 60 can decode the second part of the protocol information and forward it to the network nodes 10 in step S540. Possibly, the network nodes 10 verify the second part of the protocol information before storing it (S550). In step S560, the nodes 10 transmit second response messages to the segment controller 60. Based on the second response messages, the segment controller 60 can generate the second encryption key (S570) and decode a further part of the protocol information. These steps may be repeated, until the segment controller 60 can decode a reboot key included in the protocol information received from the service center 80 and forward the reboot key to the nodes (S580). If the reboot key is determined to be valid, the nodes 10 are rebooted and the new software is activated (S590). Preferably, the protocol is completed by transmitting a conformation message to the service center 80 in step S5100. This confirmation message may relate to acknowledgements of the nodes 10 aggregated by the segment controller 60, which may respectively include the node identity or a node specific key and a fingerprint of the activated software. By means of this confirmation message, the service center 80 can verify whether all nodes 10 have been successfully updated and whether the correct software has been used. Hence, also in this embodiment, correct protocol execution by the segment controller 60 is enforced step by step and activation of new node software is only possible after successful verification of the single protocol steps.

Figure 8:
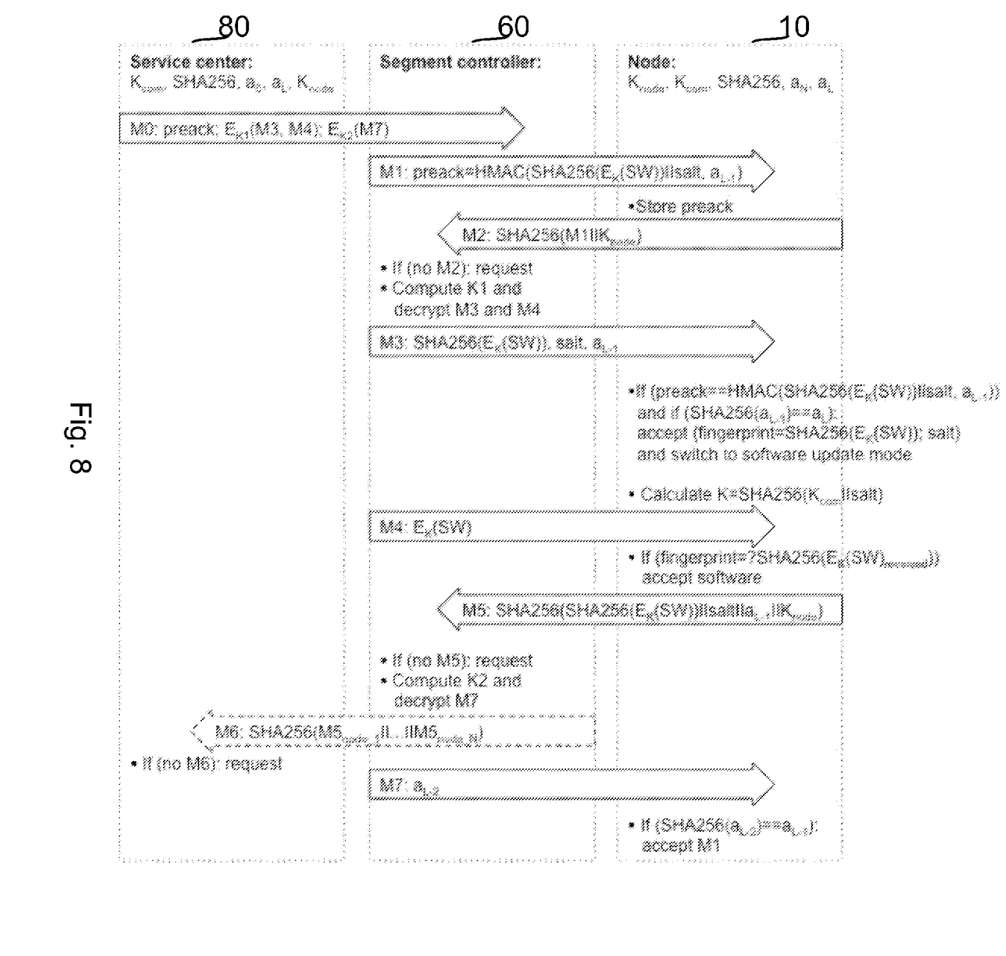
FIG. 8 shows a flow diagram illustrating an embodiment of the present invention.

In FIG. 8, an example for the second embodiment according to the present invention is illustrated in more detail. Similar to the example illustrated in FIG. 4, the service center 80 knows the commissioning key $K_{com}$ of the network, the node specific keys $K_{node}$ or node identities, the HASH-function of the network, e.g. SHA256, the initial HASH-chain element $a_0$ and the last used HASH-chain element $a_L$ or an iteration number of the HASH-function 1. The node 10 knows about its node specific key $K_{node}$ or its node identity, the commissioning key $K_{com}$, the HASH-function SHA256, the last element or anchor of the HASH-chain $a_N$ and the last used HASH-chain element $a_L$. For starting the protocol, the service center 80 transmits a first message M0 including the preack and at least two further information blocks, which are encrypted based on different encryption keys $K_i$. In the example shown, only two further information parts are shown, encrypted with encryption key K1 and K2, respectively. Thus, the message M0 may comprise:

$$M0: \text{preack}; E_{K1}(SHA256(E_k(SW)), \text{salt}, a_{L-1}, E_k(SW));$$
$$E_{K2}(a_{L-2})$$

With the message M0, the segment controller 60 should be able to execute the protocol, e.g. for updating software on the nodes 10, without further interference from the backend. However, since only the preack is not encoded, the segment controller 60 can only use the preack in the beginning. Thus, the segment controller 60 transmits a message M1 including the preack to the node 10. The preack value has been generated by the service center 80 based on the salt or random number specific for the software update, the current HASH-chain element $a_{L-1}$ and the fingerprint of the encrypted software update. For instance, the preack value may be derived as described above for the first embodiment. After receiving the preack with the message M1, the nodes 10 store the preack and return a first response message M2 that might be dependent of a fingerprint of the content of the message M1 and the respective node specific key $K_{node}$. For instance, the message M2 may include the value of the function SHA256 (M1||$K_{node}$). As described above, predefined time intervals may be set also in this embodiment for defining a maximum time interval between two messages or protocol steps. For instance, if the segment controller 60 does not receive the response messages $M2_{node\_1}, \ldots, M2_{node\_N}$ from all the nodes 10 within a predefined time interval, the segment controller 60 may request the response message M2 from the corresponding node 10. When having received all response messages $M2_{node\_1}, \ldots, M2_{node\_N}$, the segment controller 60 can determine a first encryption key K1, e.g. using a key derivation function as the next one:

$$K1=SHA256(M2_{node\_1}||\ldots||M2_{node\_N}),$$

Using this encryption key K1, the segment controller 60 can decrypt the second part of the protocol information, in the above example relating to the fingerprint of the encrypted software update SHA256($E_K$(SW)), the salt, the current HASH-chain element $a_{L-1}$ and the software update $E_K$(SW) encrypted with the encryption key K. The encryption key K can be based on the commissioning key $K_{com}$ and the salt, as described above. Then, the segment controller 60 forwards the decrypted fingerprint of the encrypted software update SHA256($E_K$(SW)), the salt and the current HASH-chain element $a_{L-1}$ in a message M3 to the node 10. After having received the message M3 from the segment controller 60, the node 10 determines whether the preack value received with the message M1 is identical to a predetermined function of the fingerprint of the encrypted software update, the salt and the current HASH-chain element $a_{L-1}$ and whether the HASH-chain element included in the message M3 is valid. If this is the case, the node 10 accepts the salt and the fingerprint of the encrypted software update included in the message M3 as software fingerprint and switches to the software update mode. Based on the salt and the commissioning key $K_{com}$, the node 10 can calculate the encryption key K. Then, the segment controller 60 transmits a further message M4 including the software update encrypted with the encryption key K to the node 10. If the result of a given fingerprint function of the received encrypted software update is identical to the previously defined fingerprint, e.g. if fingerprint=? SHA256($E_K$ (SW)$_{received}$)), the node 10 accepts the software update. Instead of transmitting two messages M3 and M4 to the node 10, the segment controller 60 can also transmit only one message including the fingerprint of the encrypted software update, the salt, the current HASH-chain element $a_{L-1}$ and the encrypted software update. In any case, the node 10 transmits a response message M5 to the segment controller 60 including a value calculated based on the fingerprint of the encrypted software update, the salt, the current HASH-chain element $a_{L-1}$ and the node specific key $K_{node}$. For instance, the value may be calculated based on the following expression:

$$SHA256(E_K(SW))||salt||a_{L-1}||K_{node})$$

In case the segment controller 60 does not receive the response message M5 from the respective mode 10 within a predefined time interval, the segment controller 60 may request this response message M5. Using the received response messages $M5_{node\_1}, \ldots, M5_{node\_N}$, the segment controller 60 can compute the second encryption key K2 and decrypt the third part of protocol information that was included in the message M0 from the service center 80. For instance, the encryption key K2 can be calculated based on the following expression:

$$K2=SHA256(M5_{node\_1}||\ldots||M5_{node\_N})$$

Optionally, the second encryption key K2 may also be used by the segment controller 60 as a conformation message to be transmitted to the service center 80. In a final step, the segment controller 60 transmits a message M7 to the node 10 including a next HASH-chain element $a_{L-2}$, which is used as a reboot key and was included in the third part of protocol information. The node 10 verifies the reboot key by determining whether the HASH-chain element is correct, e.g. by determining whether:

$$SHA256(a_{L-2})==a_{L-1}$$

If this is the case, the node 10 is rebooted and the new software is activated.

The gist of this embodiment relies on the fact that the information that the segment controller 60 has to distribute to the network nodes 10 in messages M3, M4 and M7 is encrypted with different keys K1 and K2. These encryption keys depend on the acknowledgements from the respective network nodes 10. Thus, the segment controller 60 can only decrypt and therefore use the next protocol information, if all network nodes 10 send the expected acknowledgements or response messages. In this way, correct operation is enforced and ensures the right behavior of the segment controller 60: If the segment controller 60 does not follow the protocol, it cannot use the protocol information for the next protocol steps because the information is encrypted. If the segment controller 60 behaves in the right way, it can decrypt the information and follow the expected protocol operation. Moreover, communication with the service center 80 can be reduced, since the communication takes mainly place between the partially trusted segment controller 60 and the nodes 10 without reducing system security. This allows off-line operation of the service center 80.

Therefore, according to the present invention, services from the backend can be provided by enforcing correct operation of an intermediate entity that is not fully trusted. Moreover, data traffic to the backend and operations at the backend can be minimized, thus simplifying the network management. Since the communication link between the segment controller 60 of the network and the service center 80 at the backend often relies on third party infrastructures such as GPRS, this also reduces maintenance costs of a network. The embodiments of the present invention are in particular suitable for large wireless networks such as outdoor lighting systems for enabling services from the service centre 80, e.g. for updating dimming patterns of luminaire nodes 10 in a street lighting system or for transmitting other configuration or commissioning information. Here, it is important to ensure that only nodes 10 of the network receive the information. However, the embodiments of the present invention are also applicable to any other protocol, application, system or network exhibiting a communication and trust pattern as described above, e.g. a lightweight ZigBee-IP.

The invention claimed is:

1. A system for secure protocol execution in a network, comprising:
   a node;
   a service center for providing protocol information for controlling the node; and
   a segment controller for performing a protocol according to the protocol information to control the node;
   wherein at least one response message of the node is required at the segment controller for performing one or more steps of the protocol, wherein the segment controller is configured to use the response message from the node for decryption of at least part of the protocol information.

2. The system according to claim 1, wherein the response message is based on at least one of a node identity and a fingerprint of a message received from the segment controller.

3. The system according to claim 1, wherein the segment controller is configured to forward at least a part of the decrypted protocol information to the node.

4. The system according to claim 1, wherein the segment controller has the protocol information for all steps of the protocol and/or wherein the protocol information for at least two steps is encoded based on different keys.

5. The system according to claim 1, wherein the segment controller is configured to use the response message from the node for requesting further protocol information from the service center.

6. The system according to claim 1, wherein the service center and/or the node knows about at least one of a security key, a hash function, an iteration number of a hash function and an anchor of a hash function.

7. The system according to claim 1, wherein the protocol includes providing information to the node, the information being protected based on a secret key derived from a master secret and an information identity number.

8. The system according to claim 1, wherein the service center is configured to provide a salt or a nonce specific for the protocol to the node.

9. The system according to claim 1, wherein the protocol includes at least one of the steps of providing configuration information to the node, reconfiguring the node and rebooting the node.

10. The system according to claim 1, wherein the service center is configured to provide a current hash chain link to the segment controller for rebooting the at least one controlled node.

11. The system according to claim 1, wherein the segment controller is configured to send a confirmation message to the service center based on a response message from the node.

12. The system according to claim 1, wherein the node of the network is associated to a luminaire of a lighting system.

13. A control unit for a segment controller for secure protocol execution in a network having at least one node, the control unit comprising:
    a processor to perform a protocol based on protocol information provided by a service center to control the node, wherein at least one response message of the node is required at the segment controller for performing one or more steps of the protocol, wherein the segment controller is configured to use the response message from the node for decryption of at least part of the protocol information.

14. A method for secure protocol execution in a network having at least one node, comprising the steps of:
    providing protocol information to a segment controller (60) for controlling the node; and
    performing a protocol based on the protocol information to control the node;
    wherein at least one response message of the node (10) is required at the segment controller for performing one or more steps of the protocol, wherein the segment controller is configured to use the response message from the node for decryption of at least part of the protocol information.

* * * * *